Figure 1:
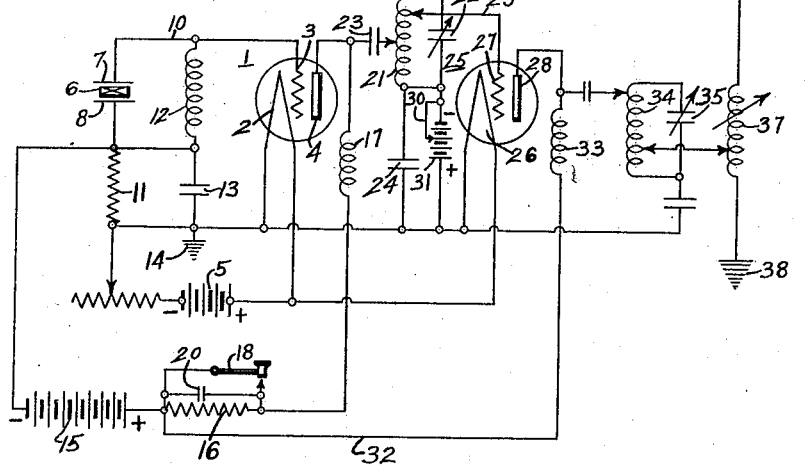

Sept. 13, 1932.  A. P. BOCK  1,876,555

SIGNALING SYSTEM

Filed May 3, 1928

INVENTOR
Ashley P. Bock
BY
ATTORNEY

Patented Sept. 13, 1932

1,876,555

UNITED STATES PATENT OFFICE

ASHLEY P. BOCK, OF SPRINGFIELD, MASSACHUSETTS, ASSIGNOR TO WESTINGHOUSE ELECTRIC & MANUFACTURING COMPANY, A CORPORATION OF PENNSYLVANIA

SIGNALING SYSTEM

Application filed May 3, 1928. Serial No. 274,697.

My invention relates to signaling systems, and it has particular relation to systems wherein the frequency of a carrier-wave is determined by a piezo-electric-crystal-controlled master-oscillator.

In general, signaling systems of the type referred to comprise a master-oscillator; one or more frequency-multipliers energized therefrom, and a plurality of power-amplifier stages fed from the last frequency-multiplier.

Signaling may be accomplished by causing the frequency of the master-oscillator to vary between predetermined limits, either by voice-controlled apparatus or by a telegraph key or relay; by modulating the output of the last frequency-multiplier; by interrupting the generation of oscillations in the master-oscillator; or by any one of a number of other methods well known to those skilled in the art.

When the transmitting equipment is located closely adjacent to the receiving equipment, as is often the case in installations designed for air-craft; either shielding or a balancing network, or both, must be interposed between the transmitting and receiving portions of the system for preventing the outgoing energy from so influencing the receiver that the reception of messages is interfered with.

If signaling is accomplished by applying a high negative bias to the amplifying device associated with the transmitter, and allowing the master-oscillator to run continuously, as is the usual practice in installations where the receiver is situated at a considerable distance from the transmitter, the oscillations of the master oscillator are usually so powerful that it has hitherto been impracticable to balance them out so completely that the operation of a sensitive receiver was possible.

If signaling is accomplished by completely stopping the oscillations in the master-oscillator, in accordance with a telegraphic code, it has heretofore been substantially impossible to so adjust the balancing network that the receiver remains unaffected by the transmitted signals. The reason for the failure of the network to give a complete balance is that the master-oscillator tube generates transient oscillations, at frequencies independent of the natural period of the control-crystal, whenever oscillations are abruptly stopped or started therein. The transient oscillations in the master-oscillator give rise to the radiation of many transient frequencies from the transmitting antenna and, since the balancing network is not tuned to such transients, the adjacent receiver is affected thereby.

Among the causes of transient oscillations may be mentioned the physical inertia of the quartz-crystal section, which inertia effectively prevents the instantaneous stopping and starting of oscillations, thus giving rise to a signal that is poor in quality and only readable with difficulty.

It is, accordingly, one object of my invention to provide, in the transmitting portion of a signaling system, instrumentalities that shall prevent the radiation therefrom of transient and parasitic frequencies.

Another object of my invention is to provide, in a high-frequency telegraphic signaling system of the type comprising a master-oscillator and a power amplifier, means for interrupting, at will, the radiation of a carrier wave without causing the radiation of transient frequencies.

Another and more specific object of my invention is to provide a radio or carrier-current-transmitting system particularly adapted for break-in operation, wherein the frequency of the radiated wave shall be substantially constant, irrespective of interruptions thereto by a keying device.

Figure 2:
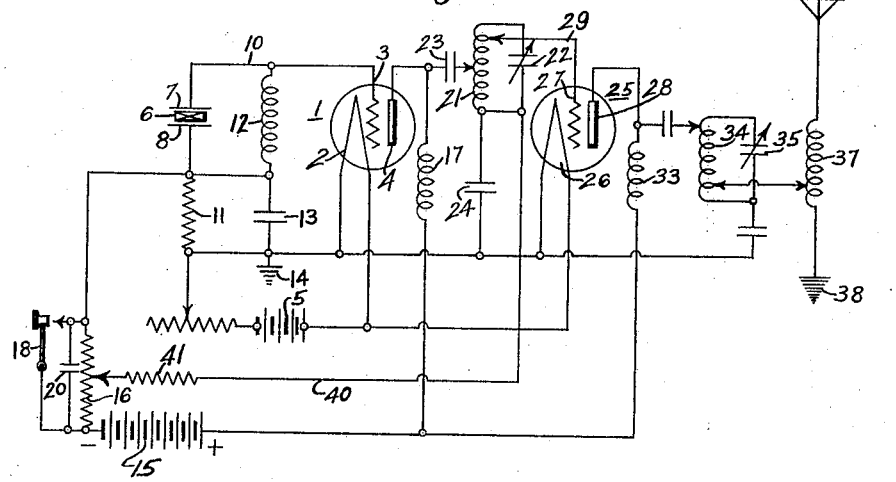

The novel features that I consider characteristic of my invention are set forth with particularity in the appended claims. The invention itself, however, both as to its organization and its method of operation, together with further objects and advantages thereof, will best be understood by reference to the following description of certain specific embodiments, taken with the accompanying drawing, in which:

Figure 1 is a diagrammatic view of the transmitting portion of a signaling system comprising a preferred embodiment of my invention, and Fig. 2 is a diagrammatic view of a signaling system comprising an alternative form of my invention.

The apparatus illustrated in Fig. 1 comprises a thermionic device 1 having a filament 2, a grid 3 and an anode 4, the filament thereof being energized from a source 5 which may be a battery, as shown, or a generator of electrical energy of any other suitable type or kind.

A piezo-electric-crystal section 6 is supported between a plurality of electrodes 7 and 8. The electrode 7 is connected to the grid 3 through a conductor 10, while the electrode 8 is connected to the filament 2 through a resistor 11. A radio-frequency choke-coil 12 is connected in shunt to the crystal-supporting electrodes and the piezo-electric crystal and, in combination with the resistor 11, provides a leakage path between the grid and the filament. A condenser 13 is preferably connected in shunt to the resistor 11 to afford a low-impedance path for high-frequency currents, and the filament is provided with a ground connection 14.

Anode potential for the thermionic device 1 is supplied from a source 15 which may be a battery, as shown, or which may be a suitable generator of any other kind. The negative terminal of the battery 15 is connected to the junction between the choke-coil 12 and the resistor 11, and the positive terminal thereof is connected to the anode 4 through a resistor 16 and a radio-frequency choke-coil 17.

A keying device 18 is connected across the resistor 16, the contacts of the device being protected against arcing by a shunting condenser 20.

The thermionic device 1 is provided with a tunable output circuit comprising an inductor 21 and a variable condenser 22 connected in shunt thereto. The inductor 21 is coupled to the anode 4 of the thermionic device 1 through a stopping-condenser 23, and is coupled to the filament through a condenser 24.

A second thermionic device 25, preferably of higher power than the thermionic device 1, having a filament 26 and a grid 27 and an anode 28, is so disposed that the grid 27 thereof is connected to a point on the output inductor 21 through a conductor 29. A source 31 of grid-biasing potential is provided for the thermionic device 25, the positive terminal thereof being connected to the filament, and the negative terminal being connected to the inductor 21 through a variable contact 30.

The tunable circuit, comprising the inductor 21 and the variable condenser 22, thus constitutes an input circuit for the thermionic device 25 as well as an output circuit for the thermionic device 1.

Anode potential for the thermionic device 25 is supplied from the common source 15, by way of a conductor 32 and a radio-frequency choke-coil 33, and the filament of the device is energized from the source 5.

The thermionic device 25 has an output circuit comprising an inductor 34 and a variable tuning condenser 35, from which circuit a connection is made to a radiating structure which may comprise an antenna 36, a variable inductor 37 and a ground connection 38. The inductors 21 and 34 can be variable, and the condensers 22 and 35 be made fixed, with the same net results.

The apparatus and circuit connections thus far described constitute a crystal-controlled master-oscillator stage, a power-amplifier stage energized therefrom, and a radiating structure fed by the power amplifier.

In systems of this general type with which I am familiar, signaling is usually accomplished by either interrupting the supply of high-frequency oscillations to the radiating structure or by modulating the amplitude of the said radiated oscillations.

As previously pointed out, when the train of oscillations is abruptly stopped and started, transient oscillations are generated which seriously militate against the possibility of shielding an adjacent receiver against the radiated energy.

In order to avoid a complicated drawing, I have omitted to show either the receiver that might be associated with my transmitting system, the balancing network, or the system of relays etc., utilized to secure break-in operation. The omitted elements are old in the art, and their omission has no effect upon the completeness of the present disclosure.

In the operation of the system illustrated in Fig. 1, the magnitude of the resistor 16 is so chosen that, when the said resistor is included in the anode supply circuit of the master oscillator, by raising the key 18, the anode potential is so far reduced that the oscillations generated thereby assume an amplitude sufficiently below the normal operating amplitude that the peak value of the voltage impressed on the grid 27 falls so far below the bias impressed thereon by the battery 31 that the thermionic device 25 does not operate as an amplifier.

At the same time, the bias on the grid of the master oscillator, being in part proportional to the anode currents which flow through the resistor 11, assumes a less negative value than it had when oscillations were being generated at maximum amplitude. This feature is quite advantageous, since, by maintaining the grid potential almost proportional to the plate potential of the master oscillator, the entire cessation of oscillations is obviated.

By properly proportioning the magnitude of the resistor 11, the potential of the source 15, the magnitude of the resistor 16 connected in shunt to the keying device 18, and the fixed biasing-potential applied to the grid 27 of the amplifier device 25 from the biasing potential source 31, I am enabled to fix the lower limit of the peak voltage of the generated oscillations considerably below the fixed amplifier bias, which is of relatively high value. Accordingly, whenever the key is in the up position, thus causing the amplitude of the generated oscillations to be lowered, the amplifier is not energized thereby, even though the said oscillations continue during the entire time the key is up. The manipulation of the keying device, therefore, causes corresponding interruptions in the radiated carrier wave without causing a corresponding interruption of the oscillations generated by the master oscillator.

In certain transmitting systems wherein carrier waves at ultra-high frequencies are employed, it is customary to utilize, for radiation, a harmonic of the natural frequency of the piezo-electric crystal which controls the oscillation generator. The stepping-up of the frequency is accomplished in one or more amplifier stages in which the grids of the thermionic tubes are so biased that the output currents from the several stages are distorted. My invention is equally well applicable to transmitting systems of the latter type, it being desirable, however, to so modify the circuit connections that a high negative potential is applied on the grids of the thermionic amplifying devices during such times as the said stages are not excited from the master oscillator.

The application of my invention to a radio transmitting system of the type wherein the frequency is progressively raised from the frequency of a piezo-electric crystal to the high frequency used for radiations is exemplified in Fig. 2.

The transmitting system illustrated in Fig. 2 is, in general, the same as the system shown in Fig. 1 and, for this reason, the corresponding elements thereof are similarly designated in the drawing. It will be noted, however, that the resistor 16 is re-positioned, being now included in the anode-potential-supply circuits for both the master oscillator and the amplifier. In addition, the source 31 of grid-biasing potential for the amplifier has been omitted, and the lower end of the inductor 21 is connected to an intermediate point on the resistor 16 by a conductor 40 and a resistor 41.

The circuit comprising the inductor 21 and the condenser 22 is tuned to a harmonic of the natural period of the piezo-electric crystal, instead of being tuned to approximately the same frequency, as in the system illustrated in Fig. 1.

In order to explain the operation of a transmitting system modified according to the showing in Fig. 2, it is first assumed that the filaments of the devices are energized and that the key 18 is in the up, or open, position. When the key is open, the resistor 16 is included in the anode-power supply circuit for the master oscillator, and serves to so reduce the magnitude of the potential applied to the anode that the oscillations generated have a small amplitude. Under these conditions, the biasing potential applied to the grid of the thermionic device 25 is determined by the difference in potential between the point on the resistor 16 to which the conductor 40 connects and the filament of the device 25, this difference in potential being occasioned by the flowing through the resistors 11 and 16 of the space current in the master oscillator, as well as the rectified grid current in the resistor 11.

The respective values of the resistors 11 and 16 are so proportioned that the grid of the amplifying device has a negative potential applied thereto when the key is in the open position, to prevent the said device from acting as an amplifier.

When the key is in its down, or closed position, the potential applied to the anodes of the thermionic device 1 and the thermionic device 25 is increased. At the same time, by reason of the increased flow of oscillator space-current and rectified grid-current through the resistor 11, the biasing potential applied to the grid of the thermionic device 1 becomes more negative, which is a desirable condition. By reason of the fact that the amplifier device 25 is now energized by oscillations of normal amplitude from the oscillator, rectified grid current flows therein, as well as anode or output current. If the conductor 40 connects to the mid-point of the resistor 16, the grid current, multiplied by one fourth of the resistance of the said resistor 16, gives the drop in potential thereacross occasioned by the grid current. Also, the grid current times the resistance of the resistor 41 provides means for any additional drop that may be needed. To this drop is added the drop across the resistor 11, occasioned by the amplifier grid current flowing therein, and by the combined anode currents of the oscillator and the amplifier. The summation of the several potential drops enumerated serves to fix the grid potential of the amplifier with reference to the filament thereof, at such times as oscillations of maximum amplitude are impressed thereon from the master oscillator, and the resistors are so chosen that the grid potential resulting is such as to cause the amplifier to distort.

It will thus be seen that I have provided, in the system illustrated in Fig. 2, circuit connections whereby the grid bias of a master oscillator is controlled by the plate current flowing therein. Accordingly, when the key is in its up or open position, the oscillations in the master oscillator are reduced in amplitude but are not stopped, while, at the same time, the grid potential of the frequency-changing device is given such value that the device cannot amplify the feeble oscillations impressed thereon. When the key is in its down or closed position, the amplitude of the generated oscillations increases, and the bias potential applied to the grid of the frequency changer is altered to such value as to permit energization thereof. The device then produces a distorted output current containing a harmonic of the oscillator frequency, which harmonic is either directly radiated or is further changed or amplified previous to radiation.

Both of the systems described are advantageous in that the exciting oscillations therein never abruptly stop or start but merely change in amplitude. The radiated wave, in either event, therefore, is free from transient frequencies and, by reason of the freedom from such transients, a nearby receiver can be easily and effectively shielded therefrom by the interposition of properly tuned and proportioned balancing networks.

In one highly successful commercial embodiment of that modification of my invention illustrated in Fig. 2, the thermionic device 1 was of the type known as UX 210, the thermionic device 25 was represented by two UX 210 devices connected in parallel, the resistor 11 had a value of 200 ohms, the resistor 16 had a magnitude of 32,000 ohms, and the resistor 41 was of the order of 5,000 ohms. The potential of the source 15 was 550 volts, while the biasing potential applied to the grid of the device 25 was in the neighborhood of 260 volts. The fall in potential across the resistor 11 when the key was open, was about 3 volts, and the potential fall across the same resistor when the key was down, was about 60 volts. The voltage difference between the conductor 40 and the extremities of the resistor 16 was found to be about 120 volts, with the key closed. With the key open, the drop across the resistor 16 caused by the reduced space current in the tube 1 was found to be 247 volts.

The total bias potential applied to the grid of the amplifier tube 25 was about 250 volts, with the key open, and about 180 volts, with the key closed. This high operating bias produces the desired distortion in the tube 25.

While I am not, at this time, prepared to state with exactness the theory underlying my invention, it is my observation that, by its practice, I am enabled to cause the radiation of substantially a single carrier-frequency unaccompanied by transient frequencies which give rise to "clicks" and "key-thumps" that cannot be successfully balanced out from the input of an adjacent receiver.

Many other advantages of my invention will be apparent to those skilled in the art to which it pertains. My invention, therefore, is not to be restricted to the specific circuits chosen for illustration, but is to be limited only by the prior art or by the spirit of the appended claims.

I claim as my invention:

1. In a signaling system, an oscillation generator, an amplifier controlled thereby, means for determining the input-voltage to which said amplifier is responsive, and signaling means for, at will, reducing the amplitude of the oscillations generated by said generator to below said input voltage, whereby signaling may be accomplished without entirely interrupting the generation of said oscillations.

2. In a signaling system, an oscillation generator, an amplifier controlled thereby, means for fixing the input voltage to which said amplifier is responsive, means for, at will, reducing the amplitude of the oscillations generated by said generator to below said amplifier input voltage, and means for preventing the entire cessation of oscillations in said generator, whereby signaling may be accomplished by interrupting the output of said amplifier without causing the generation of transient oscillations.

3. In a signaling system, an oscillation generator, an amplifier energized therefrom, means for supplying plate potential to said generator and said amplifier, means for deriving grid-biasing potentials from said plate-potential source, means for varying said plate potential to control the amplitude of oscillations generated, and means whereby the biasing potential applied to said amplifier is rendered less negative when the amplitude of the generated oscillations is caused to increase, the same means serving to render the biasing potential applied to said amplifier more negative when the amplitude of said oscillations is decreased.

In testimony whereof, I have hereunto subscribed my name this 5th day of April, 1928.

ASHLEY P. BOCK.